US007019088B1

(12) United States Patent
Lehmann et al.

(10) Patent No.: US 7,019,088 B1
(45) Date of Patent: Mar. 28, 2006

(54) HARDENABLE MATERIALS WHICH CONTAIN URETDIONE GROUPS, METHOD FOR THE PRODUCTION AND PROCESSING THEREOF, AND THEIR UTILIZATION

(75) Inventors: Frank Lehmann, Dresden (DE); Michaela Gedan-Smolka, Ortrand (DE); Dieter Lehmann, Coswig (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 09/856,474

(22) PCT Filed: Dec. 3, 1999

(86) PCT No.: PCT/EP99/09465

§ 371 (c)(1),
(2), (4) Date: Jul. 31, 2001

(87) PCT Pub. No.: WO00/34355

PCT Pub. Date: Jun. 15, 2000

(30) Foreign Application Priority Data

Dec. 10, 1998 (DE) ............................... 198 56 878

(51) Int. Cl.
*C08G 18/22* (2006.01)
*C08G 18/40* (2006.01)
*C08G 18/70* (2006.01)

(52) U.S. Cl. ........................ 525/460; 525/453; 528/45; 528/55; 528/85; 428/423.1

(58) Field of Classification Search ................ 525/453, 525/460; 528/45, 55, 85; 428/423.1
See application file for complete search history.

(56) References Cited

U.S. PATENT DOCUMENTS

| | | | | |
|---|---|---|---|---|
| 3,923,743 A * | 12/1975 | Quiring et al. | ............. | 525/440 |
| 4,442,280 A * | 4/1984 | Grogler et al. | ............... | 528/54 |
| 4,463,154 A * | 7/1984 | Disteldorf et al. | ............ | 528/45 |
| 4,732,957 A | 3/1988 | Schuster et al. | | |
| 5,621,064 A | 4/1997 | Laas et al. | | |
| 5,756,634 A | 5/1998 | Braunstein et al. | | |
| 6,613,861 B1 * | 9/2003 | Gras | .......................... | 528/45 |

FOREIGN PATENT DOCUMENTS

| | | |
|---|---|---|
| DE | 2312391 | 9/1974 |
| DE | 2420475 | 11/1975 |
| EP | 0045994 | 2/1982 |
| EP | 0045998 | 2/1982 |
| EP | 0639598 | 2/1995 |
| EP | 0669353 | 8/1995 |
| EP | 0803524 | 10/1997 |
| WO | 91/07452 | 5/1991 |

* cited by examiner

*Primary Examiner*—Jeffrey B. Robertson
(74) *Attorney, Agent, or Firm*—Joseph C. Gil; Thomas W. Roy

(57) ABSTRACT

The invention is used in the fields of chemistry and relates to hardenable materials which can be used for producing lacquers. The aim of the invention is to provide materials which harden at low temperatures in the same amount of time as the others. This is achieved by using hardenable materials containing uretdione groups and containing (A) a binding agent constituent, whereby this component either (A1) does not contain carboxyl groups, or (A2) the concentration of carboxyl groups is less than that of the catalyst (C) or (A3) in the case of a high level of concentration, a quantity of a reactive agent is added. The hardenable materials also contain (B) a polyaddition compound which comprises uretdione groups, and (C) at least one Lewis acid catalyst. The aim of the invention is also achieved using a method for producing materials of this type in which the starting materials are homogenized in a solution and/or in a melt, the solution and/or melt is then rapidly cooled, and the subsequent processing is carried out afterwards to effect a complete cross-linking.

41 Claims, No Drawings

HARDENABLE MATERIALS WHICH CONTAIN URETDIONE GROUPS, METHOD FOR THE PRODUCTION AND PROCESSING THEREOF, AND THEIR UTILIZATION

BACKGROUND OF THE INVENTION

1. Field of the Invention

The present invention relates to the field of chemistry and concerns hardenable masses, such as are used, for example, for the production of coatings, and a process for their production and processing.

2. Discussion of Background Information

The blocking of isocyanates by means of dimerization to uretdiones is an effective method of protecting isocyanate groups from premature reaction. The coating of heat-resistant substrates, in particular with powder coatings, is an important area of application for hardeners containing uretdione groups.

Powder coatings are free of solvents and, as a result, are free of harmful emissions to a large extent and they have a very high coating equivalent. Thus, powder coating is a very environmentally friendly and economical coating method.

Polyurethane-based coatings especially distinguish themselves with special light and weather resistance and excellent optical characteristics. The polyurethane powder coatings used today in practice are based on polyesters carrying fixed hydroxyl groups as well as fixed aliphatic and/or cycloaliphatic polyisocyanates whose isocyanate functions are protected by external, low-molecular masking agents. These masking agents escape at least partially during the thermal hardening of the powder coating. These emissions run contrary to the principle of a lack of emissions in powder coating formulations and, for reasons of ecology and workplace hygiene, require special provisions.

By using cross-linkers containing uretdione groups (e.g., DE 23 12 391 OS, EP 045 998 A1, EP 669 353 A1), the possibility exists of avoiding such emissions of low-molecular substances. Due to the low level of reactivity of the internally blocked isocyanate groups, the use of corresponding hardeners containing uretdione groups has been limited up to the present day because the temperatures of greater than 160° C. necessary for hardening are too high and/or the time necessary for hardening is too long. In view of the costs of energy and the possibility of coating thermolabile substrates (e.g., plastic or wood), it is necessary to increase the reactivity of such systems.

Various attempts have been made to accelerate the hardening of polyurethane masses based on hardeners containing uretdione groups by using catalysts. A series of compounds has been suggested, such as the known metalorganic catalysts known from polyurethane chemistry such as tin (II) acetate, tin (II) octoate, tin (II) ethyl caproate, tin (II) laurate, dibutyltin diacetate, dibutyltin dilaureate, dibutyltin maleate (e.g., EP 045 994 A1, EP 045 998 A1, WO 91/07452, or DE 24 20 475), iron (III) chloride, zinc chloride, zinc 2 ethyl caproate, and molybdenum glykolate or tertiary amines such as triethylamine, pyridine, methylpyridine, benzyl dimethylamine, N,N endo ethylenepiperazine, N methylpiperidine, pentamethyldiethylene triamine, N,N dimethylaminocyclohexane, and N,N' dimethylpiperazine (e.g., n EP 639 598 A1).

Generally, organic tin compounds of the type mentioned are used in practice. The increases in reactivity that can be achieved by means of these catalysts do not yet meet the requirements of masses hardening at low temperatures.

In EP 803 524 A1, compounds containing N,N' trisubstituted amidines as breakdown catalysts are described. The object of this prior art is a polyurethane powder coating that contains a bonding agent component having hydroxyl groups, a polyaddition compound having uretdione groups and, optionally, free isocyanate groups based on aliphatic and/or cycloaliphatic diisocyanates, at least one N,N,N' trisubstituted catalyst containing amidine structures with an amidine group content (calculated as CN2; molecular weight=40) of 12.0 to 47.0 wt-%, optionally other catalysts known from polyurethane chemistry, and optionally other auxiliary agents and additives known from powder coating technology. The bonding agent components having hydroxyl groups are added to the powder coating in such amounts that 0.6 to 1.4, preferably 0.8 to 1.2 isocyanategroups of the uretdione groups and optionally polyaddition compounds having free isocyanate groups occur on each hydroxyl group of the bonding agent component, with isocyanate groups being understood as the total of isocyanate groups present in dimeric form and free isocyanate groups. In the publication, possible hardening temperatures of 130° C. and up are mentioned. However, it can be seen in the exemplary embodiments that, at hardening temperatures up to 170° C., coatings of a high degree of quality are not achieved.

SUMMARY OF THE INVENTION

The object of the present invention is to provide masses containing uretdione groups with a high reactivity that harden at lower temperatures in the same amount of time or at the same temperature in a considerably shorter amount of time than the masses containing uretdione groups known up to now.

The object is attained by means of the invention in accordance with claims 1 and 11. Further developments are the object of the subclaims.

It was possible to attain the objects of the present invention by providing the masses according to the invention. The masses according to the invention are based on the fact that, under the conditions according to the invention, Lewis acid catalysts, in particular metalorganic compounds, accelerate the transformation of uretdione groups with hydroxyl groups so strongly that, with their help and using the known uretdione hardeners, masses can be produced that already harden at comparatively low temperatures in the same amount of time or at the same temperatures in a considerably shorter period of time than the masses containing uretdione hardeners that have been known up to now.

DETAILED DESCRIPTION OF THE PRESENT INVENTION

The invention relates to masses containing uretdione groups that are hardenable at low temperatures containing A) a bonding agent component having hydroxyl groups, B) a polyaddition compound having uretdione groups and optionally free isocyanate groups as a cross-linker, C) at least one active or reactively activatable Lewis acid catalyst, optionally D) further catalysts known from polyurethane chemistry, and optionally E) auxiliary agents and additives that are known per se, provided that (A1) the bonding agent component is free of carboxyl groups or (A2) the concentration of carboxyl groups is less than the concentration of active catalyst (C) or (A3) in the case of a higher concentration of carboxyl groups with regard to the concentration of the catalyst (C) used such an amount of reactive agent such as, for example, epoxy compound or oxazoline is added that is necessary for blocking the amount of carboxyl groups for achieving the required concentration of the active catalyst (C).

The object of the invention is also the use of the masses for coating of heat-resistant and thermolabile substrates, for masking of components, as a treatable, hardenable molding compound, and as a thermally hardenable surfacer.

The component A) contained in the mass according to the invention is a bonding agent having any unspecified hydroxyl group with a hydroxyl number of 25 to 400, preferably 25 to 200 and an average molecular weight of 400 to 20,000, preferably 1,000 to 10,000, which is present above the reaction or treatment temperature in a liquid or viscous form. Such bonding agents are, for example, polyesters, polyacrylates, polyethers, or polyurethanes containing hydroxyl groups, as well as any unspecified mixtures of such resins.

The component B) contained in the mass according to the invention is a polyaddition compound that is present in a liquid or viscous form above the reaction or treatment temperature that contains uretdione groups and, optionally, free isocyanate groups based on aliphatic and/or cycloaliphatic diisocyanates, in particular those based on 1,6-hexamethylene diisocyanate (HDI), 1-isocyanato-3,3,5-trimethyl-5-isocyanatomethylcyclohexane (IPDI), 4,4'-diisocyanatodicyclohexylmethane, 1,3 diisocyanato-2(4)-methylcyclohexane, or any unspecified mixture of these diisocyanates, with HDI and IPDI being preferred.

The component B) is used in the masses according to the invention in such amounts that, on every hydroxyl group of the bonding agent component A), 0.8 to 2.4, preferably 0.9 to 2.2 isocyanate groups of the component B) occur; isocyanate groups of component B) is to be understood as the sum of isocyanate groups present in dimeric form as uretdione groups and free isocyanate groups.

In order to accelerate hardening, the masses according to the invention contain Lewis acid catalysts C), preferably metalorganic compounds such as, for example, of the tin and/or zinc and/or cadmium and/or iron and/or manganese and/or molybdenum and/or aluminum and/or cobalt and/or zirconium type in the absence or presence of tertiary amine and/or present or reactively forming ammonium and/or N,N,N' trisubstituted amidine and/or present or reactively forming phosphonium and/or imidazole and/or epoxy compounds for activating or increasing the effects of the catalyst.

Catalysts C) that may be used are metalorganic compounds of the general formula $$R_2MeX_2$$

in which

Me means metal,

R means alkyl residue, and

X means carboxylate residue as well as metalorganic compounds of the general formula $$R_2MeY_2$$

in which

Me means metal,

R means alkyl residue, and

Y means alcoholate residue as well as metalorganic compounds of the general formula $$Z_nMe$$

in which

Me means metal,

Z means acteylacetonate residue, and n=2 or 3, or any unspecified mixtures of such metalorganic catalysts.

Catalysts C) that may be used are also derivatives of the above-mentioned compounds from consecutive reactions such as, for example, hydrolysis and decomposition products or any unspecified mixtures of these derivatives or any unspecified mixtures of the above-mentioned catalysts with these derivatives.

The catalysts C) are used in the masses according to the invention in an amount of 0.01 to 5.0 wt-%, preferably 0.1 to 3.0 wt-%, in relation to the total amount of components A) to D).

Optionally, compounds known from polyurethane chemistry may also be used in the masses according to the invention as further catalysts D).

Optionally, masses according to the invention can contain auxiliary materials and additives (E) that are known per se, such as flow improvers, light screening agents, UV absorbers, pigments, or color stabilizers, for example.

The homogenization of the individual components of the mass occurs by means of mixing the components in melts, preferably in a laboratory kneader, co-kneader, or extruder. The temperature and/or mixing time and/or revolutions per minute are adjusted such that, during homogenization, essentially no branching or polymer formation reactions occur yet. First, for example, a melting of component A occurs in the laboratory kneader. Then the addition of components B and E occurs successively. Finally, the dosage of the catalyst C or catalyst mixture C and D occurs, preferably as a batch. For the homogenization in a co-kneader or in an extruder, for example, all components are thoroughly mixed and subsequently homogenized in the co-kneader or extruder. The homogenization of the components occurs at mass temperatures between 50 and 110° C., preferably between 70 and 100° C. and lasts up to 30 min. In order to achieve an optimal intermixing, a dual extrusion in the co-kneader or extruder may be advantageous; here, the component C may optionally also not be added until during the second extrusion step.

The homogenized mass is subsequently solidified by means of quick cooling. This occurs by means of applying the melt to a cooling belt or insertion in liquid nitrogen. The solidified mass is broken and crushed or, in the case of powder coatings, subsequently ground into powder using a classifier mill with a particle size of <90 μm.

The homogenization of the components can also occur in solution. Here, the homogenization temperature lies above room temperature and essentially does not exceed 110° C. Advantageously, at least one of the components (A–E), preferably A and/or B, is present in a fluid form in which at least one of the other components may be dissolved. The homogenized mass is subsequently cooled to temperatures of at least 20 K below the mixing temperature by means of quenching and can then be stored until it is treated.

Highly reactive, thermally hardenable systems may be produced in which the reactive components including catalysts and, optionally, other additives depending on the application are homogenized, for example, by means of melting extrusion and subsequently crushed and/or pulverized and have a sufficiently high storage stability.

In the further processing of the masses according to the invention for coating, the powder coating formulas produced in this manner can be applied to the substrates to be coated using conventional coating processes such as, for example, electrostatic powder spraying or fluid-bed coating. The hardening of the coatings occurs by means of heating to temperatures of 110 to 200° C., preferably to temperatures of 120 to 180° C. until a complete cross-linking is achieved and no more reaction heat can be detected using DSC measurements. Here, the increase in temperature occurs linearly and/or nonlinearly and/or the temperature is kept constant at the reaction temperature. At higher temperatures that correspond to the hardening temperatures of the prior art, hardening occurs in a significantly shorter time. On the other hand, the hardening can be achieved according to the invention at significantly lower temperatures. The hardening of the hardenable masses can be performed, for example, in two or more subsequent or temporally separated hardening stages at the same or different hardening temperatures.

After the partial cross-linking of the hardenable masses or, for example, a layer in the first hardening stage, the hardening optionally occurs after treatment in the second hardening stage. During hardening, for example, a chemical coupling of masses or layers in the border surface of the hardenable masses or coatings is possible.

The first reaction stage is performed at relatively low temperatures, preferably ≦160° C. If the amount of the catalyst (C) used is reduced, the temperature for the first reaction stage must be increased and/or the reaction time must be prolonged. The second reaction stage is performed at least at the same reaction temperatures with a considerably longer reaction time or preferably at higher temperatures than the first reaction stage in a shorter time until complete hardening.

Any unspecified heat-resistant substrates such as, for example, glass or metals, but also thermolabile substrates such as plastics or wood may be coated according to the invention.

By using the catalysts according to the invention under the conditions described, the conversion of the hardeners containing uretdione groups with bonding agent components containing hydroxyl groups at comparatively low temperatures is possible.

If the carboxyl group content of the bonding agent component B) equal to or greater than the content of the catalyst C), it is possible to block a sufficient amount of carboxyl groups by adding, for example, epoxy compounds, such that a catalytically effective concentration of the active catalyst C) occurs.

While the use of dialkyltin carboxylates as catalysts for the cross-linking of bonding agents containing hydroxyl groups with hardeners containing uretdione groups is known according to the prior art, no catalyst activity of the metalorganic compounds described on the conversion of the uretdione function can be discerned under the conditions described. The hardening temperatures of the masses containing uretdione groups described in the prior art, which have been decreased in comparison to uncatalyzed masses, can rather be attributed to an acceleration of the conversion of the isocyanate groups with hydroxyl groups that have been thermally recovered from the uretdione rings.

The invention will be described in greater detail below with reference to exemplary embodiments.

Example 1 shows the prior art in the form of an uncatalyzed composition.

EXAMPLES

The compounds (A) and (B) are homogenized in a laboratory kneader. The temperature of the kneader chamber is adjusted such that the mass temperature does not substantially exceed 90° C. The compounds (E), (D), and (C) are then added to this mass in succession.

The compositions of the exemplary mixtures are provided in Table 1. The characteristics of the components used are provided in Table 2.

The homogenized masses are cooled quickly by insertion in liquid nitrogen. The quickly cooled masses are crushed in a laboratory mill while being cooled and dried at 30° C. in a vacuum. The characterization of the samples occurs by means of differential scanning calorimetry (DSC). The tests occur dynamically in a temperature range of 40 to 260° C. at a heating speed of 10 K/min. The results are provided in Table 3.

TABLE 1

| | Composition of the Exemplary Mixtures* | | | | | | | |
|---|---|---|---|---|---|---|---|---|
| Components/Example | 1 | 2 | 3 | 4 | 5 | 6 | 7 | 8 |
| (A) Hydroxyl-terminated polyester | 75.7 | 75.7 | 75.7 | 75.7 | 75.7 | 75.7 | — | 75.7 |
| (A1) Hydroxyl-terminated polycaprolacton | — | — | — | — | — | — | 76.7 | — |
| (A3) Triglycidyl isocyanurate | 2.9 | 2.9 | 2.9 | 2.9 | 2.9 | — | — | — |
| (B) Polyaddition compound containing uretdione groups | 24.3 | 24.3 | 24.3 | 24.3 | 24.3 | 24.3 | 24.3 | 24.3 |
| (C) Dibutyltin dilaurate | — | 1.0 | — | — | — | — | — | — |
| (C) Dibutyltin dibutylate | — | — | 1.0 | — | — | — | — | — |
| (C) Zinc acetyl acetonate | — | — | — | 1.0 | 1.0 | 1.0 | 1.0 | 3.0 |
| (D) Benzyltrimethylammonium chloride | — | — | — | — | 1.0 | 1.0 | — | — |

TABLE 1-continued

| Composition of the Exemplary Mixtures* | | | | | | | | |
|---|---|---|---|---|---|---|---|---|
| Components/Example | 1 | 2 | 3 | 4 | 5 | 6 | 7 | 8 |
| (E) Acronal 4F | — | — | — | — | — | 0.6 | — | — |
| (E) White pigment | — | — | — | — | — | 0.6 | — | — |

*all amounts are in wt %.

TABLE 2

| Characteristics of the Components Used in the Examples | | | | |
|---|---|---|---|---|
| Component | Hydroxyl number | Car-boxyl number | Iso-cyanate equiva-lent | $T_m$ (° C.) |
| Hydroxyl-terminated polyester | 30 | ≦5 | — | 56 |
| Hydroxyl-terminated polycaprolacton | 56 | ≦0.1 | — | 40–50 |
| Triglycidyl isocyanurate | — | — | — | 98 |
| Polyaddition compound containing uretdione groups | — | — | 310 | 54 |

TABLE 3

| Results of the Thermal Tests (dynamic) | | | | | | | | |
|---|---|---|---|---|---|---|---|---|
| Sample Number | 1 | 2 | 3 | 4 | 5 | 6 | 7 | 8 |
| Beginning of the reaction $T_{onset}$ (° C.) | 184.2 | 144.0 | 134.9 | 131.0 | 128.2 | 123.6 | 122.4 | 119.1 |
| Reaction maximum $T_{max}$ (° C.) | 211.8 | 164.6 | 160.3 | 145.3 | 145.2 | 141.6 | 139.4 | 141.8 |

TABLE 4

| Results of the Thermal Tests (isothermic) | | | | | |
|---|---|---|---|---|---|
| Example | 1 | 2 | 3 | 4 | 5 |
| Reaction temperature in ° C. | 150 | 150 | 150 | 130 | 130 |
| Reaction time (min) until the most complete possible cross-linkage | —*) | 17 | 16 | 12 | 12 |

*)No appreciable cross-linkage noted.

What is claimed is:

1. A hardenable mass containing uretdione groups containing:

(A) a linear or branched bonding agent component which has at least one of terminal and side chain hydroxyl groups, a hydroxyl number of 25 to 400, and an average molecular weight of 400 to 20,000, and which is present in a fluid or viscous form above the reaction or processing temperature;

(B) a polyaddition compound which is present in a fluid or viscous form above the reaction or processing temperature, contains uretdione groups and is based on at least one aliphatic and/or cycloaliphatic diisocyanate; and (C) at least one active or reactively activatable Lewis acid catalyst;

said bonding agent component (A):

(A1) being free of carboxyl groups, or (A2) having a concentration of carboxyl groups less than a concentration of active catalyst (C), or (A3) having a concentration of carboxyl groups higher than a concentration of active catalyst (C), and an amount of reactive agent is added to block an amount of carboxyl groups in order to realize a concentration of active catalyst (C); and wherein:

(C1) in the case of (A1) and (A2), the use of Lewis acid carboxylates as catalysts is excluded.

2. The hardenable mass according to claim 1, further comprising at least one other catalyst utilizable in urethane chemistry.

3. The hardenable mass according to claim 1, further comprising auxiliary materials and additives.

4. The hardenable mass according to claim 1, wherein said polyaddition compound (B) contains free isocyanate groups.

5. The hardenable mass according to claim 1, wherein bonding agent component (A) comprises a polymer component having hydroxyl groups.

6. The hardenable mass according to claim 5, wherein the polymer component comprises at least one of polyacrylates, polyethers, polyesters, and oligo- and polyepoxides.

7. The hardenable mass according to claim 1, wherein polyaddition compound (B) comprises a polyaddition compound based on at least one of isophorone diisocyanate and hexamethylene diisocyanate.

8. The hardenable mass according claim 7, wherein the polyaddition compound (B) contains free isocyanate groups.

9. The hardenable mass according to claim 1, wherein said reactive agent comprises at least one of an epoxy compound and an oxazoline compound.

10. The hardenable mass according to claim 1, wherein said at least one active or reactively activatable Lewis acid catalyst (C) comprises at least one metalorganic catalyst of the general formula:

$$R_2MeX_2$$

in which
Me is metal,
R is alkyl residue, and
X is carboxylate residue.

11. The hardenable mass according to claim 1, wherein said at least one active or reactively activatable Lewis acid catalyst (C) comprises at least one metalorganic catalyst of the general formula:

$R_2MeY_2$ in which
Me is metal,
R is alkyl residue, and
Y is alcoholate residue.

12. The hardenable mass according to claim 1, wherein said at least one active or reactively activatable Lewis acid catalyst (C) comprises at least one metalorganic catalyst of the general formula:

$Z_nMe$ in which
Me is metal,
Z is acetylacetonate residue, and
n is 2 or 3.

13. The hardenable mass according to claim 1, in which said at least one active or reactively activatable Lewis acid catalyst (C) comprises at least one derivative of at least one metalorganic catalyst of:

(a) the general formula $R_2MeX_2$ in which
Me means metal,
R means alkyl residue, and
X means carboxylate residue; and (b) the general formula $R_2MeY_2$ in which
Me means metal,
R means alkyl residue, and
Y means alcoholate residue; and (c) the general formula $Z_nMe$ in which
Me means metal,
Z means acetylacetonate residue, and
n means 2 or 3.

14. The hardenable mass according to claim 1, in which said at least one active or reactively activatable Lewis acid catalyst (C) comprises mixtures of at least one metalorganic catalyst of:

(a) the general formula $R_2MeX_2$ in which
Me means metal,
R means alkyl residue, and
X means carboxylate residue; and (b) the general formula $R_2MeY_2$ in which
Me means metal,
R means alkyl residue, and
Y means alcoholate residue; and (c) the general formula $Z_nMe$ in which
Me means metal,
Z means acetylacetonate residue, and
n means 2 or 3; and at least one derivative of the at least one metalorganic compound.

15. The hardenable mass according to claim 2, wherein said other catalyst utilizable in urethane chemistry comprises nucleophillic substances.

16. The hardenable mass according to claim 1, wherein said bonding agent component (A) has a hydroxyl number of 25 to 200 and an average molecular weight of 1,000 to 10,000.

17. A process for production of a hardenable mass containing uretdione groups, comprising:

(a) homogenizing components in at least one of a solution and a melt, at the longest until an increase in molar mass can be verified, said components comprising:
 (A) a linear or branched bonding agent component which has at least one of terminal and side chain hydroxyl groups, a hydroxyl number of 25 to 400, and an average molecular weight of 400 to 20,000, and which is present in a fluid or viscous form above the reaction or processing temperature;
 (B) a polyaddition compound which is present in a fluid or viscous form above the reaction or processing temperature, contains uretdione groups that are not cross-linked and is based on at least one aliphatic and/or cycloaliphatic diisocyanate; and
 (C) at least one active or reactively activatable Lewis acid catalyst;
 said bonding agent component (A):
 (A1) being free of carboxyl groups, or
 (A2) having a concentration of carboxyl groups less than a concentration of active catalyst (C), or
 (A3) having a concentration of carboxyl groups higher than a concentration of active catalyst (C), and an amount of reactive agent is added to block an amount of carboxyl groups in order to realize a concentration of active catalyst (C); and
 wherein:
 (C1) in the case of (A1) and (A2), the use of Lewis acid carboxylates as catalysts is excluded, and (b) quickly cooling the at least one of a solution and a melt to below a reaction temperature of a resulting hardenable mass; and (c) processing of the resulting hardenable mass to complete cross-linking.

18. The process according to claim 17, wherein the resulting hardenable mass is stored prior to processing of the resulting hardenable mass to complete cross-linking.

19. The process according to claim 17, wherein the processing of the resulting hardenable mass to complete cross-linking includes increasing the temperature of the resulting hardenable mass by at least one of linearly and non-linearly, or maintaining a constant reaction temperature sufficiently long until essentially no more reaction heat can be verified using DSC measurements.

20. The process according to claim 17, wherein the homogenizing of the resulting hardenable mass is performed in a melt in a laboratory kneader or at least one of a co-kneader and an extruder.

21. The process according to claim 17, wherein the homogenizing of the resulting hardenable mass is performed at temperatures less than or equal to 110° C.

22. The process according to claim 21, wherein the homogenizing of the resulting hardenable mass is performed at temperatures between 50 and 100° C.

23. The process according to claim 17, wherein the homogenizing of the resulting mass is performed for up to 30 min.

24. The process according to claim 17, wherein the cooling below a reaction temperature after the homogenization is performed by insertion of the resulting hardenable mass into liquid nitrogen or by applying the resulting hardenable mass to a cooling belt.

25. The process according to claim 23, wherein resulting hardenable mass comprises a melt.

26. The process according to claim 17, wherein at least one of the components is used in a fluid form.

27. The process according to claim 19, wherein the temperature is increased at least one of linearly and non-linearly in a range of preferably 20° K above a homogenization temperature up to a maximum of 200° C.

28. The process according to claim 27, wherein the temperature is increased at least one of linearly and non-linearly in a range of preferably 20° K above a homogenization temperature up to a maximum of 180° C.

29. The process according to claim 17, wherein a catalyst other than catalyst (C) is added at reduced temperatures after the homogenizing of components (A), (B) and (C).

30. The process according to claim 17, wherein the homogenizing of the resulting hardenable mass is in a melt.

31. The process according to claim 17, wherein the homogenizing of the resulting hardenable mass is performed in at least one stage in a melt, with the catalyst being added at lower temperatures in a single-stage homogenization and, in a multi-stage homogenization, the catalyst not being added until a second stage at lower temperatures.

32. The process according to claim 19, wherein the temperature is increased in stages and the temperature is kept constant after every increasing step for a time period of 1 to 60 minutes.

33. The process according to claim 19, wherein the temperature is increased in stages and the temperature is kept constant after every increasing step for a time period of 5 to 30 minutes.

34. The process according to claim 19, wherein the temperature is increased in two stages, with the second increase in temperature being performed immediately thereafter or temporarily later.

35. A heat-resistant substrate coated with the hardenable mass according to claim 1.

36. A thermolabile substrate coated with the hardenable mass according to claim 1.

37. A masking component comprising the hardenable mass according to claim 1.

38. A treatable, hardenable coating form comprising the hardenable mass according to claim 1.

39. A thermally hardenable molding compound comprising the hardenable mass according to claim 1.

40. A thermally hardenable surface comprising the hardenable mass according to claim 1.

41. A hardenable mass produced by the process according to claim 1.

* * * * *